United States Patent [19]

Kebede et al.

[11] Patent Number: 4,527,772
[45] Date of Patent: Jul. 9, 1985

[54] MODULATING CONTROL VALVE

[75] Inventors: Berhanu Kebede, Inglewood; Marion L. George, Northridge, both of Calif.

[73] Assignee: International Telephone & Telegraph Corp., New York, N.Y.

[21] Appl. No.: 443,361

[22] Filed: Nov. 22, 1982

[51] Int. Cl.³ .............................................. F16K 31/10
[52] U.S. Cl. ........................................ 251/138; 137/82
[58] Field of Search .............................. 251/138, 129; 137/625.61, 82

[56] References Cited

U.S. PATENT DOCUMENTS 2,121,321  6/1938  Kronmiller ...................... 251/138 X
2,636,516  4/1953  Armstrong et al. ............. 251/138 X
3,284,044  11/1966 Zaleske et al. ...................... 251/138
4,120,481  10/1978 von Koch ...................... 251/138 X
4,268,009  5/1981  Allen, Jr. ............................ 251/138

FOREIGN PATENT DOCUMENTS 1239892  7/1960  France ......................... 137/625.61

Primary Examiner—Arnold Rosenthal
Attorney, Agent, or Firm—T. L. Peterson; J. S. Christopher

[57] ABSTRACT

A flapper-poppet (new) that differs from a flapper-nozzle (old) in that the flapper-nozzle is a second stage operator that employs an amplifier which operates on de-amplified pressure. Although both the flapper-poppet and the flapper-nozzle are controlled by a conventional torque motor, the flapper-poppet is a first stage operator which operates on high supply pressure.

8 Claims, 5 Drawing Figures

MODULATING CONTROL VALVE

BACKGROUND OF THE INVENTION

This invention relates to controls for actuators, and more particularly to a modulating control valve for an electro-hydraulic linear or rotary actuator or the like.

PRIOR ART STATEMENT

It has been known in the prior art that the opening of a valve could be held stationary, could be modulated or could be controlled by the pressure at the outlet of a modulating control valve. See, for example, Keller et al., U.S. Pat. No. 3,620,185.

It is also old in the art to move a flapper by the use of an electromagnetic actuator. In this case, the flapper may open and close a nozzle modulating the volume and/or pressure of the liquid at the nozzle output.

Prior art electro-hydraulic actuators required a large number of component parts. These parts provided a continuous modulating control of the actuator output shaft in response to a control signal input.

In the prior art, it was difficult to achieve a good seal at a high pressure, high (dump) flow, and sharp cut-off. Further, a hydraulic amplifier was required.

Other related U.S. patents are listed below:
U.S. Pat. Nos. 3,087,470; 3,353,353; 3,375,659; 3,393,508; 3,407,708; 3,492,921; 3,503,303; 3,516,332; 3,656,592; 3,675,538.

SUMMARY OF THE INVENTION

The above-described and other disadvantages of the prior art are overcome by providing a flapper operated poppet.

Few component parts are required. A good seal is also provided and high fluid pressure can be supplied at a high (dump) flow rate. A sharp cut-off is also possible.

BRIEF DESCRIPTION OF THE DRAWINGS

In the accompanying drawings which illustrate exemplary embodiments of the present invention.

DESCRIPTION OF THE PREFERRED EMBODIMENT

The invention is not limited to but may be used in connection with a valve actuator or the like as those shown in the said Keller et al. patent.

Figure 1:
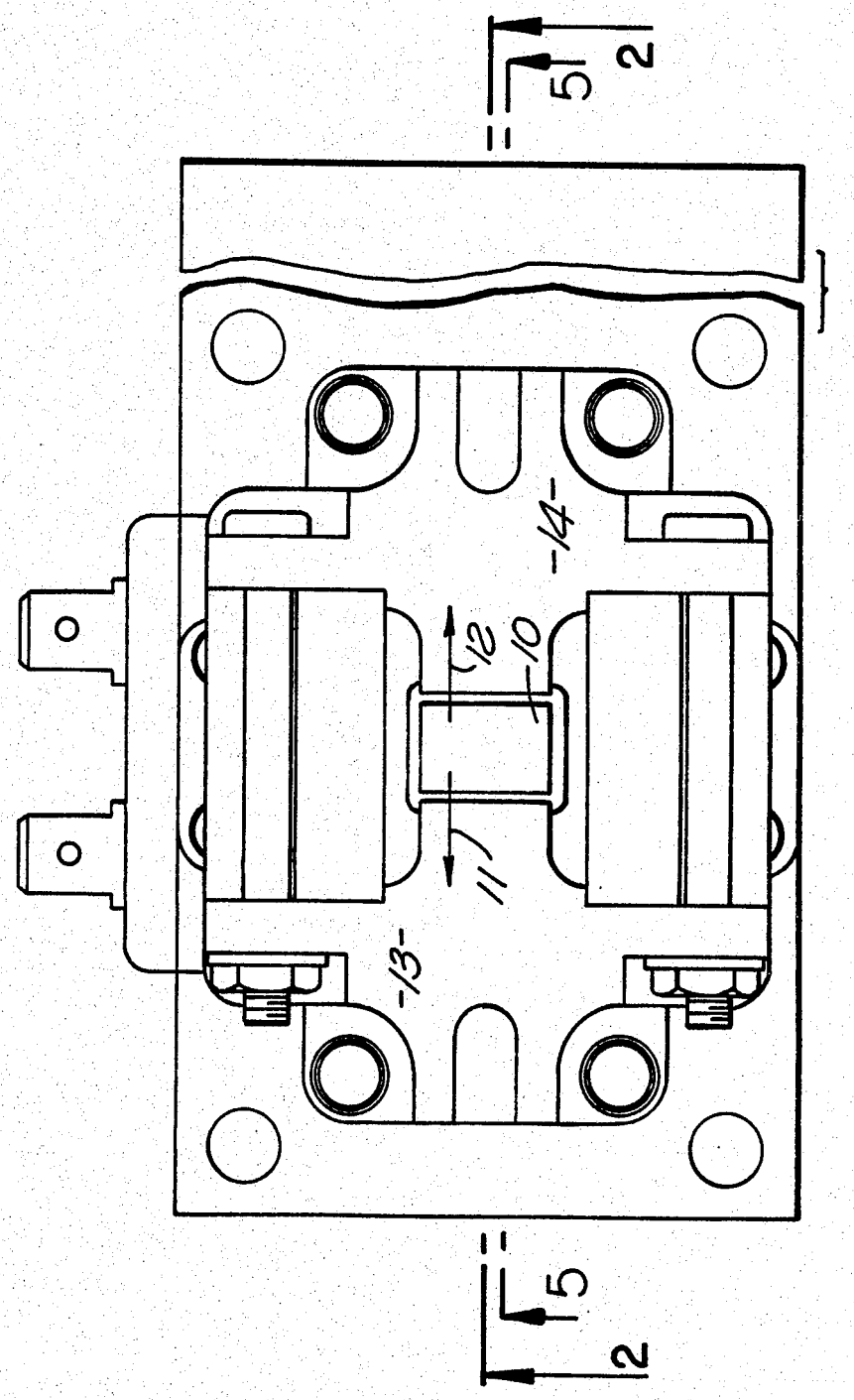
FIG. 1 is a top plan view of a torque motor constructed in accordance with the present invention.
Figure 3:
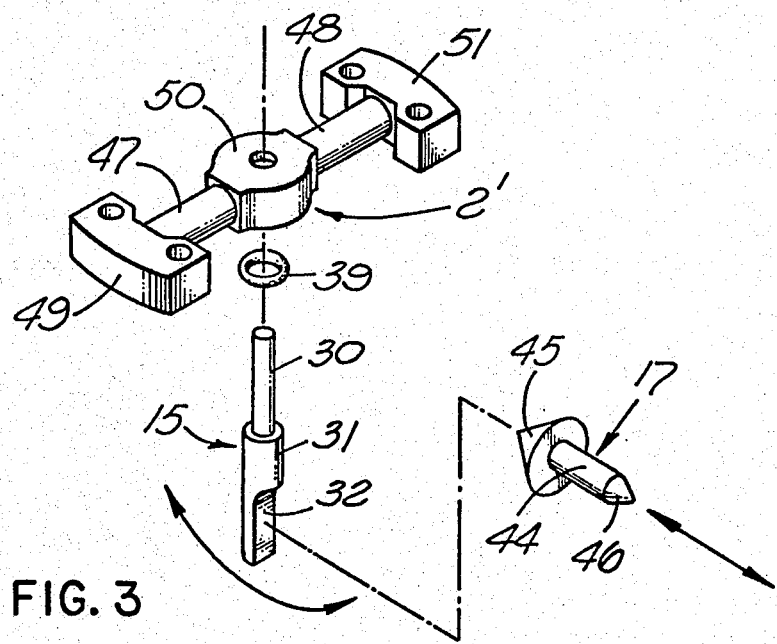
FIG. 3 is an exploded perspective view of a portion of the structure shown in FIG. 2.

In FIG. 1, an armature 10 is shown. Armature 10 is moved in the direction of an arrow 11 or in the direction of an arrow 12. There are electromagnetic poles at 13 and 14. FIG. 1 is a top plan view of a "torque motor." The torque motor (including a certain kind of "flapper") is entirely conventional but only as illustrated in FIG. 3.

Figure 2:
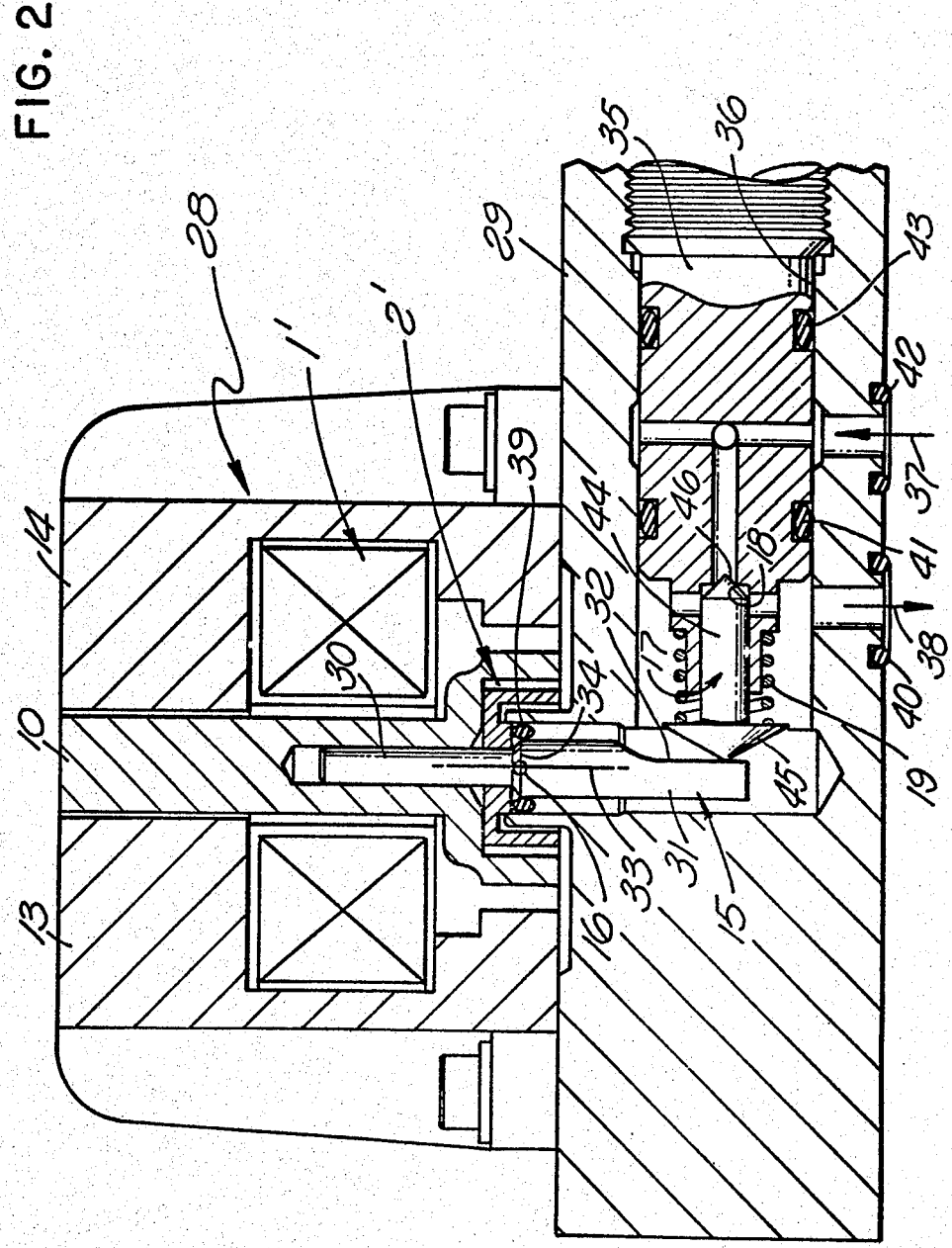
FIG. 2 is a vertical sectional view through the torque motor taken on the line 2—2 shown in FIG. 1.
Figure 4:
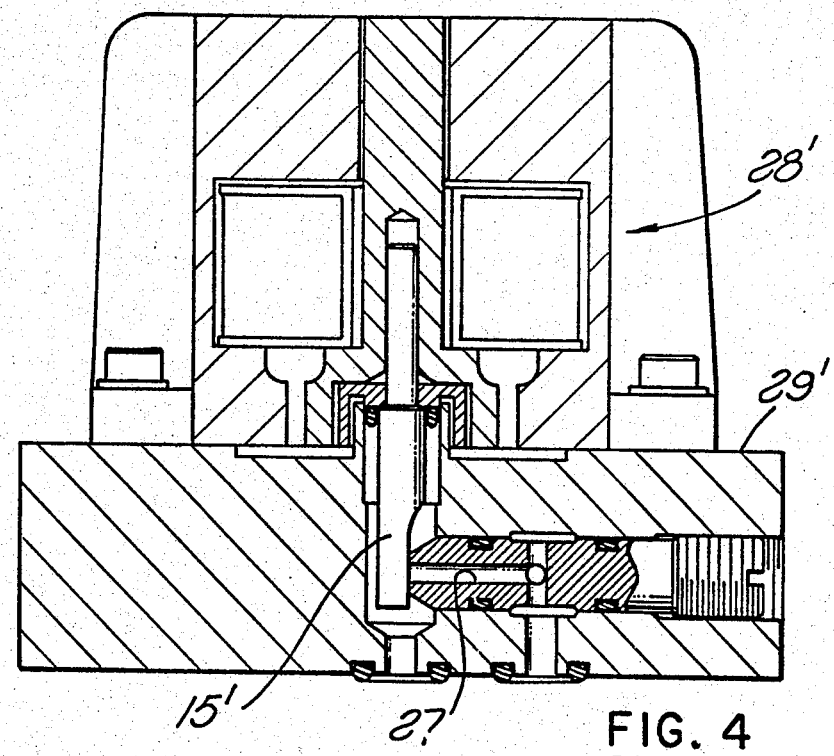
FIG. 4 is a vertical sectional view of a prior art torque motor, flapper and nozzle.

From the Keller et al. patent and FIG. 4, note will be taken that Keller's orifice at the left end of passageway 27 has been omitted in FIG. 2 and that "flapper" 15 does not bear upon an orifice as does Keller's vane (flapper) 26. Instead, flapper 15 (FIG. 2) operates a poppet 17 having a seat 18.

The advantages of the present invention, in part, exist because amplifier 21 in the Keller et al. patent may be omitted. Yet the invention will work at high pressure and high flow with a sharp fluid cut off. The pressure reduction of Keller's amplifier 21 is no longer needed because a very good seal is provided by poppet 17 in FIG. 2.

Flapper 15 rotates about an axis 16 (FIG. 2) normal to the plane of the paper.

Due to the fluid pressure, in one embodiment coiled spring 19 may be omitted however, coil spring 19 is usually located between base 29 and conical head 45.

In FIG. 2 an electromagnetic operator 28 is fixed to a base 29. The same is true of a support 2' fixed relative to both flapper 15 and to base 29. Support 2' is made of a flexible metal, e.g. beryllium copper.

A coil is shown at 1'.

Armature 10 is fixed to flapper 15. Flapper 15 has a smaller cylindrical portion 30 and a larger cylindrical portion 31 with a flat 32.

Lines 33 and 34 are typical construction lines to show the location of axis 16.

Part 35 is fixed relative to and inside bore 36.

Inlet and outlet ports are illustrated respectively at arrows 37 and 38.

In FIG. 4, note will be taken that operator 28' above base 29' is identical to operator 28 in FIG. 2 or vice versa. Flapper 15 is identical to flapper 15'.

The torque motor including operator 28' may be any one of several conventional torque motors including but not limited to one of the type manufactured and sold by MOOG Inc. Controls Division, East Aurora, New York, N.Y. 14052.

Poppet 17 may be made of stainless steel, if desired.

O-rings are provided at 39, 40, 41, 42 and 43 in FIG. 2.

In FIG. 2, poppet 17 has a stem 44, a conical head 45, and a conical valve 46.

Support 2' has torsion rods 47 and 48, as shown in FIG. 3, integral with parts 49, 50 and 51.

Portion 30 in FIG. 2 is bonded to armature 10 by epoxy or otherwise.

Figure 5:
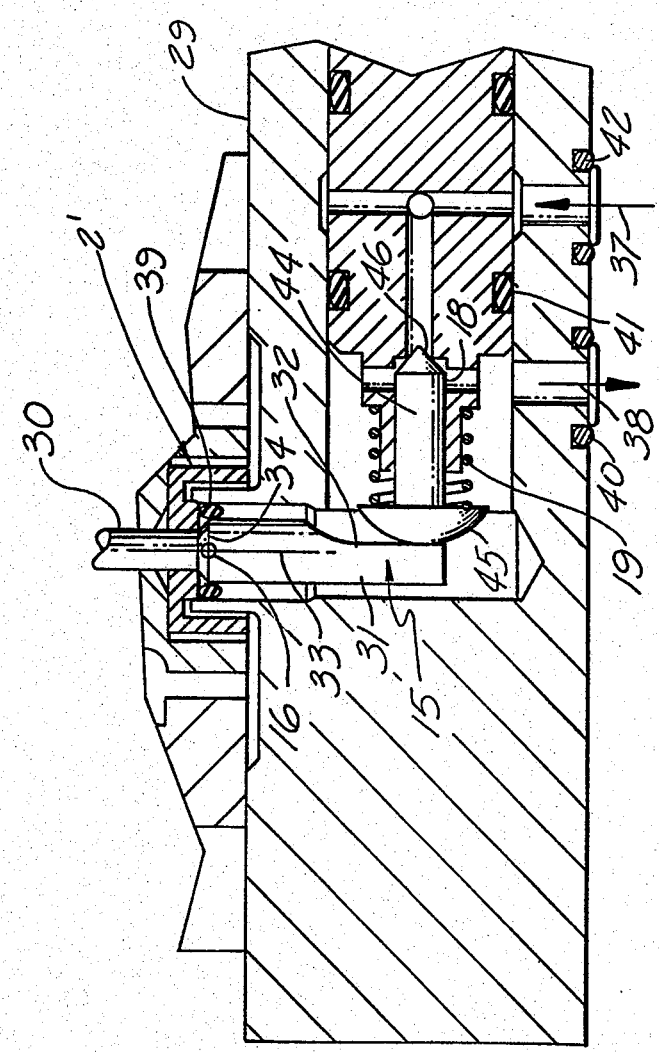
FIG. 5 is a fragmentary vertical sectional view taken along the line 5—5 shown in FIG. 1 and disclosing an alternative construction.

Heat 45 may alternatively be spherical or a spherical segment as illustrated in FIG. 5.

What is claimed is:

1. A modulating control valve comprising in combination:
   a body;
   first and second ports extending into said body;
   a passageway located inside said body, said passageway having an input end connected from said first port, said first port being an inlet port;
   a valve seat at an output end of said passageway;
   a poppet slidable in said body from a position sealing said valve seat shut to a position spaced therefrom, said poppet controlling communication between said passageway and said second port, said second port being an outlet port, said poppet having a stem and a head connected to said stem at a first end thereof; and
   an electromagnetically operable flapper mounted in said body, said flapper including a flat portion engageable with said head to reciprocate said stem by such engagement, said reciprocation causing said poppet to close and to open in direct proportion to the excitation applied to said electromagnetically operable flapper, said head being conical about an axis approximately normal to said flat portion, said conical head including a flared end interfacing with said first end of said stem, said flared end for retaining a coil compression spring intermediate said body and said conical head and being concentric with said stem and said conical head further including a pointed end biased against said flat portion by said coil compression spring, said flapper being elongate and having a longitudinal axis and being rotatable through an arc about an axis approximately midway along the length of said flapper and normal to said longitudinal axis and said poppet slidable in a translational trajectory of said passageway wherein said rotatable flapper and said translational poppet provide a smooth modulating control employing said conical head pointed end as an interface.

2. A modulating control valve as set forth in claim 1, wherein said flapper is approximately cylindrical and wherein said flat portion being positioned in a plane parallel to said rotational axis to engage said conical head.

3. A modulating control valve as set forth in claim 2, wherein said poppet having a conical valve at a second end of said stem and said valve seat essentially including a circular knife edge to be engaged by said conical valve when said flapper is operated.

4. A modulating control valve as set forth in claim 1, wherein said poppet having a conical valve at a second end of said stem and said valve seat essentially including a circular knife edge to be engaged by said conical valve when said flapper is operated.

5. A modulating control valve comprising in combination:
a body;
first and second ports extending into said body;
a passageway located inside said body, said passageway having an input end connected from said first port, said first port being an inlet port;
a valve seat at an output end of said passageway;
a poppet slidable in said body from a position sealing said valve seat shut to a position spaced therefrom, said poppet controlling communication between said passageway and said second port, said second port being an outlet port, said poppet having a stem and a head connected to said stem at a first end thereof; and
an electromagnetically operable flapper mounted in said body, said flapper including a flat portion engageable with said head to reciprocate said stem by such engagement, said reciprocation causing said poppet to close and to open in direct proportion to the excitation applied to said electromagnetically operable flapper, said head being spherical about an axis approximately normal to said flat portion, said spherical head including a flared end interfacing with said first end of said stem, said flared end for retaining a coil compression spring intermediate said body and said spherical head and being concentric with said stem and said spherical head being biased against said flat portion by said coil compression spring, said flapper being elongate and having a longitudinal axis and being rotatable through an arc about an axis approximately midway along the length of said flapper and normal to said longitudinal axis and said poppet slidable in a translational trajectory of said passageway wherein said rotatable flapper and said translational poppet provide a smooth modulating control employing said spherical head end as an interface.

6. A modulating control valve as set forth in claim 5, wherein said flapper is approximately cylindrical and wherein said flat portion being positioned in a plane parallel to said rotational axis to engage said spherical head.

7. A modulating control valve as set forth in claim 6, wherein said poppet having a conical valve at a second end of said stem and said valve seat essentially including a circular knife edge to be engaged by said conical valve when said flapper is operated.

8. A modulating control valve as set forth in claim 5, wherein said poppet having a conical valve at a second end of said stem and said valve seat essentially including a circular knife edge to be engaged by said conical valve when said flapper is operated.

* * * * *